US007297055B2

(12) United States Patent
Sar et al.

(10) Patent No.: US 7,297,055 B2
(45) Date of Patent: Nov. 20, 2007

(54) VACUUM-INSULATING SYSTEM AND METHOD FOR GENERATING A HIGH-LEVEL VACUUM

(75) Inventors: David R. Sar, Corona, CA (US); Jerry D. Withrow, Victorville, CA (US)

(73) Assignee: Raytheon Company, Waltham, MA (US)

(*) Notice: Subject to any disclaimer, the term of this patent is extended or adjusted under 35 U.S.C. 154(b) by 447 days.

(21) Appl. No.: 10/802,064

(22) Filed: Mar. 16, 2004

(65) Prior Publication Data

US 2005/0204752 A1 Sep. 22, 2005

(51) Int. Cl.
*B01D 8/00* (2006.01)

(52) U.S. Cl. .................... 462/55.5; 417/901; 335/216; 330/65

(58) Field of Classification Search .................. 62/55.5
See application file for complete search history.

(56) References Cited

U.S. PATENT DOCUMENTS

| | | | | |
|---|---|---|---|---|
| 3,177,672 | A * | 4/1965 | Seelandt | 62/45.1 |
| 3,533,011 | A * | 10/1970 | Muller et al. | 331/94.1 |
| 3,582,805 | A * | 6/1971 | Kliphuis | 330/56 |
| 3,626,046 | A * | 12/1971 | Krause et al. | 264/81 |
| 4,607,493 | A * | 8/1986 | Sukenobu | 62/55.5 |
| 4,972,677 | A * | 11/1990 | Moriya et al. | 62/50.2 |
| 5,551,244 | A * | 9/1996 | Bailey | 62/51.2 |
| 5,687,574 | A * | 11/1997 | Longsworth et al. | 62/55.5 |
| 5,855,118 | A * | 1/1999 | Lorimer | 62/55.5 |
| 5,862,671 | A * | 1/1999 | Lessard et al. | 62/55.5 |
| 6,043,137 | A * | 3/2000 | Krueger et al. | 438/471 |
| 6,122,920 | A * | 9/2000 | Hill et al. | 62/55.5 |
| 6,122,921 | A * | 9/2000 | Brezoczky et al. | 62/55.5 |
| 6,257,001 | B1 * | 7/2001 | Muldowney et al. | 62/55.5 |

OTHER PUBLICATIONS

Welch, Kimo M., Capture Pumping Technology, 2001, Elsevier, 2nd edition, Chapter 5.*

* cited by examiner

*Primary Examiner*—Cheryl Tyler
*Assistant Examiner*—John Pettitt
(74) *Attorney, Agent, or Firm*—Schwegman, Lundberg & Woessner, P.A.

(57) ABSTRACT

A method of generating a high-level vacuum comprises evacuating a chamber having a substantially-pure gas therein to a medium-level vacuum, and freezing the residual gas to generate the high-level vacuum within the chamber. Impurities, such as atmospheric air, may be purged from the chamber by evacuating the chamber to a medium level vacuum (e.g., around $10^{-2}$ Torr) and subsequently filling the chamber with the gas. This purging process may be repeated multiple times to decrease the level of impurities in the gas filling the chamber. The substantially-pure gas may have an impurity-level of less than approximately 100 PPM and may comprise carbon-dioxide, although the scope of the invention is not limited in this respect. The medium level vacuum may range between approximately $1\times10^{-2}$ Torr and $5\times10^{-2}$ Torr allowing the use of a roughing pump, and the high-level vacuum may range between approximately $1\times10^{-5}$ and $1\times10^{-8}$ Torr.

9 Claims, 2 Drawing Sheets

VACUUM-INSULATING SYSTEM AND METHOD FOR GENERATING A HIGH-LEVEL VACUUM

TECHNICAL FIELD

Embodiments of the present invention pertain to vacuum-insulating systems and, in particular, to generating vacuums for insulating cryogenic systems.

BACKGROUND

Systems that operate at cryogenic temperatures generally utilize a high-level vacuum to provide sufficient insulation. Conventional methods for generating a high-level vacuum require powerful vacuum pumps, such as turbo pumps, operating for many hours and even days depending on the volume to be evacuated. These conventional methods make it difficult to quickly deploy systems, such as cryogenic systems requiring a high-level vacuum, in the field. Furthermore, the powerful vacuum pumps required by conventional methods tend to be relatively delicate and very expensive making them less suitable to field operations.

Thus, there are general needs for improved vacuum-insulating systems and methods for generating high-level vacuums. There are also general needs for systems and methods that can generate high-level vacuums more quickly. There are also general needs for systems and methods that can generate high-level vacuums without the use of delicate and/or expensive high-power vacuum pumps. There are also general needs for systems and methods more suitable for field operations that can generate high-level vacuums.

SUMMARY

A method of generating a high-level vacuum comprises evacuating a chamber having a substantially-pure gas therein, and freezing the residual gas to generate a high-level vacuum within the chamber. Impurities, such as atmospheric air, may be purged from the chamber by filling the chamber with the gas. In some embodiments, the gas may be slightly pressurized to a pressure of approximately 100 Torr, although the scope of the invention is not limited in this respect. In some embodiments, the substantially-pure gas may have an impurity-level of less than approximately 100 PPM, and may comprise carbon-dioxide, although the scope of the invention is not limited in this respect. The high-level vacuum generated by the freezing gas may range between approximately $1\times10^{-5}$ Torr and $2\times10^{-8}$ Torr.

In some embodiments, the chamber may be evacuated to a medium-level vacuum (e.g., around $10^{-2}$ Torr) with a less-expensive roughing pump, and the filling and the evacuating may be repeated to reduce impurities from the chamber to obtain a high concentration of the substantially-pure gas. In some embodiments, after filling the chamber with the gas, the gas may be evacuated from the chamber prior to freezing to generate a medium-level vacuum (e.g., around $10^{-2}$ Torr). In some embodiments, the medium-level vacuum maybe approximately ¼ of atmospheric pressure, although the scope of the invention is not limited in this respect.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims.

Figure 1:
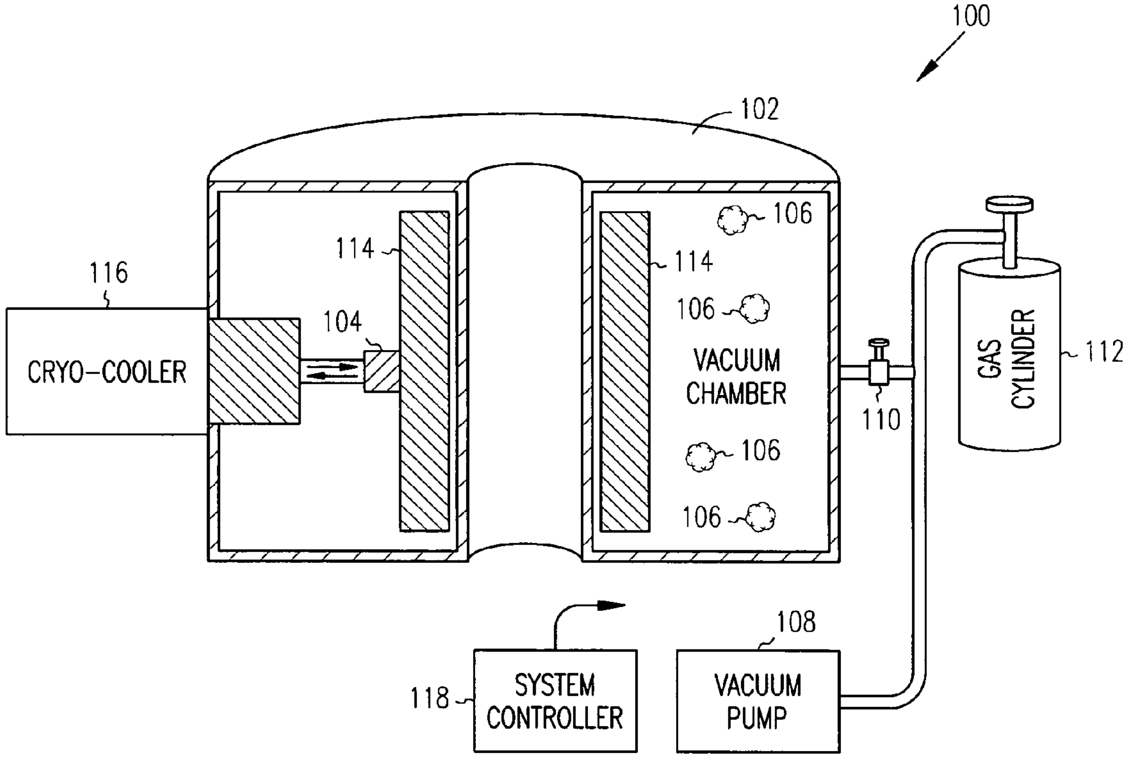
FIG. 1 illustrates a vacuum-insulation system in accordance with some embodiments of the present invention.

FIG. 1 illustrates a vacuum-insulation system in accordance with some embodiments of the present invention. Vacuum-insulation system 100 may be used to generate insulating vacuums, including high-level vacuums, for use with devices which may require vacuum insulation. Vacuum-insulation system 100 comprises chamber 102 and cooling element 104. Chamber 102 may have a substantially-pure gas 106 therein at less than atmospheric pressure, and cooling element 104 may freeze gas 106 which generates a high-level vacuum within chamber 102. In some embodiments, the high-level vacuum may range between approximately $1\times10^{-5}$ and $1\times10^{-8}$ Torr, although the scope of the invention is not limited in this respect.

In some embodiments, system 100 may further comprise vacuum pump 108 to evacuate chamber 102 to a medium-level vacuum (e.g., below atmospheric pressure) before cooling element 104 operates to freeze gas 106. In some embodiments, vacuum pump 108 may be a roughing pump capable of generating the medium-level vacuum. In some embodiments, the medium-level vacuum may range from about $1\times10^{-2}$ Torr to about ¼ of atmospheric pressure, although the scope of the invention is not limited in this respect.

In some embodiments, system 100 may further comprise one or more valves 110 operable to allow gas 106 into chamber 102 for purging the chamber and operable to allow vacuum pump 108 to evacuate chamber 102 to the medium-level vacuum. In some embodiments, one or more valves 110 may be operable to allow gas 106 into chamber 102 for repeatedly purging chamber 102 with gas 106. One or more valves 110 may also be operable to repeatedly allow vacuum pump 108 to evacuate the chamber to the medium-level vacuum. This may significantly reduce impurities within chamber 106 and may help obtain a high concentration of gas 106 in chamber 102.

In some embodiments, system 100 may further comprise gas cylinder 112 having the substantially-pure gas therein. The gas within cylinder 112 may be at a pressure higher than atmospheric pressure allowing cylinder 112 to at least slightly pressurize chamber 102 with gas 106 (e.g., to approximately 100 Torr). This may be done prior to vacuum pump 108 evacuating chamber 102 before freezing. In some embodiments, gas cylinder 112 may contain approximately five pounds of gas, depending on the volume of chamber 102, the particular gas and its impurity level, among other things.

An acceptable impurity level of the substantially-pure gas may depend on the temperature and pressure at which gas 106 is to be frozen, and the required high vacuum magnitude. In some embodiments, substantially-pure gas 106 may have an impurity-level of less than approximately 100 PPM. In some embodiments, the gas may be carbon dioxide and may have a freezing point below approximately 200 degrees Kelvin at the medium-level vacuum generated in chamber 102, although the scope of the invention is not limited in this respect. In other embodiments, gas 106 may comprise substantially pure water vapor having an impurity level of less than 100 parts per million. Gas with greater impurity levels may be used but may require a higher medium-level vacuum and/or a cooler freezing temperature. Gas with lower impurity levels may also be used at possibly a lower medium-level vacuum and/or a greater freezing temperature; however gas with lower impurity levels is generally significantly more expensive.

In some embodiments, chamber 102 may comprise a magnet-chamber and may further comprise magnet 114 within chamber 102. In these embodiments, cooling element 104 may reduce the pressure within chamber 102 by cooling magnet 114 to at or below a freezing point of gas 106 at the medium-level vacuum within chamber 102. In some embodiments, after freezing the gas and generating the high-level vacuum, cooling element 104 may further cool magnet 114 to a cryogenic temperature by virtue of the increased insulation provided by the high level vacuum. The high-level vacuum within chamber 102 may provide insulation for the cryogenically-cooled magnet.

In some embodiments, cooling element 104 may be a cooling head which may be part of cryogenic cooler 116. Cryogenic cooler 116 may be almost any type of cooler for generating cryogenic temperatures, and in some embodiments may comprise a Gifford-McMahon cooling system, although the scope of the invention is not limited in this respect. In some embodiments, magnet 114 may comprise a helium refrigerator therein and may be cooled to a temperature as low as 4 degrees Kelvin, for example.

In some embodiments, system 100 may further comprise system controller 118 which may at least in part, automate the high-level vacuum-generating process. In some embodiments, system controller 118 may operate one or more valves 110, vacuum pump 108, and cooling element 104. In these embodiments, system controller 118 may control these elements to repeatedly purge chamber 102 with gas 106, evacuate chamber 102 to the medium-level vacuum, and cool chamber 102 to generate the high-level vacuum.

Although system 100 is illustrated with vacuum pump 108, gas cylinder 112 and/or system controller 118, these elements may not necessarily be required in field use once the high-level vacuum is generated. For example, vacuum pump 108, gas cylinder 112 and/or system controller 118 may be coupled with chamber 102, the high-level vacuum may be generated, and vacuum pump 108, gas cylinder 112 and/or system controller 118 may be removed. The high-level vacuum may be used, for example, until it degrades to an unacceptable level and may thus need to be regenerated. Although system chamber 102 is illustrated as a cylindrical magnetic chamber having a central cylindrical opening, this is not a requirement. Embodiments of the preset invention are applicable to almost any chamber. For example, in some embodiments, chamber 102 may comprise a vacuum chamber such as the vacuum jacket of a Dewar-type vacuum-insulated container. FIG. 1 illustrates a cross-sectional view of chamber 102 and magnet 114 for clarity.

In some embodiments, magnet 114 may be an electromagnet cooled to a superconducting temperature to generate a high-level magnetic field. In these embodiments, system 100 may be used for cooling a superconducting magnet for a radar tube in a radar system. In these embodiments, the electromagnet may be used to generate a magnetic field for use in controlling a path of an electron beam in an RF power tube of a transmitter of the radar system. The electromagnet may have windings that become superconducting when cooled by a cooling element and insulated by the high-level vacuum. In some other embodiments, magnet 114 may be superconducting magnet in a magnetic-resonance-interference (MRI) diagnostic imaging system.

In some other embodiments, a vacuum insulated chamber may be used as part of an infrared seeker of a missile. In these embodiments, the chamber for insulating a cryogenically-cooled seeker head may be provided with a substantially-pure gas therein. The chamber may be a vacuum chamber with a medium-level vacuum. After launch of the missile, a cooling liquid, such as liquid argon, may be used to freeze the gas within the chamber and generate (in flight) a high-level vacuum. The cooling liquid may further cool the seeker which may be insulated by the in-flight generated high-level vacuum. In these embodiments, less cooling liquid may be required than used for cooling conventional seekers.

Figure 2:
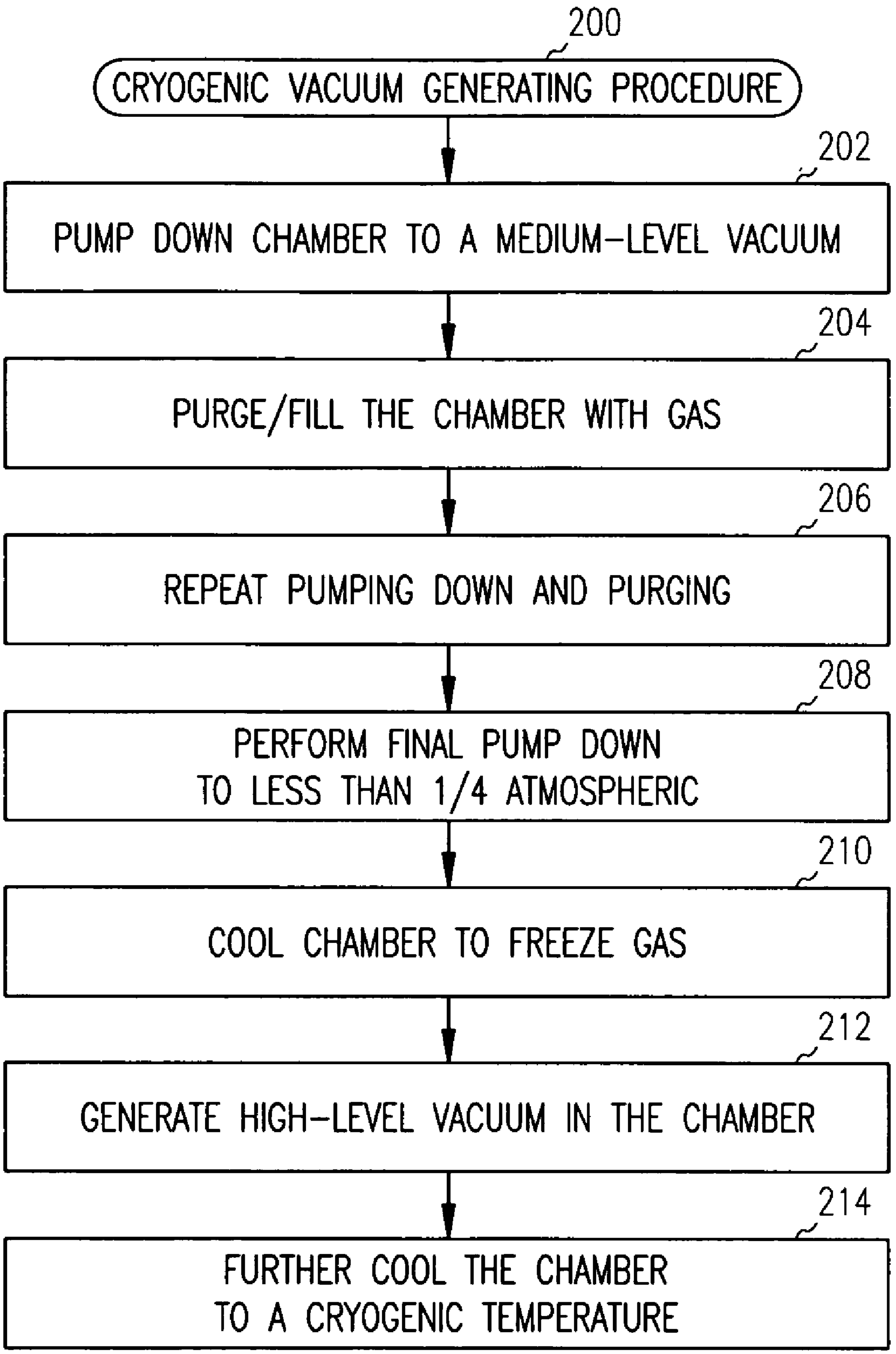
FIG. 2 is a flow chart of a vacuum-generating procedure in accordance with some embodiments of the present invention.

FIG. 2 is a flow chart of a vacuum-generating procedure in accordance with some embodiments of the present invention. Vacuum-generating procedure 200 may be used for generating a high-level vacuum and may be performed by a system such as vacuum-insulation system 100, although other systems may also be suitable. Procedure 200 generates a high-level vacuum at least by evacuating a chamber having a substantially-pure gas therein and freezing the residual gas to generate a high-level vacuum within the chamber.

Operation 202 evacuates (i.e., pumps down) a chamber to a medium-level vacuum. The medium-level vacuum may range, for example, between approximately $1\times10^{-2}$ Torr and $5\times10^{-2}$ Torr, although the scope of the invention is not limited in this respect.

Operation 204 purges impurities from the chamber with the gas by filling the chamber with a substantially-pure gas. The impurities may comprise, for example, atmospheric air as well as other impurities in the chamber. Operation 204 may comprise filling the chamber with the gas, and in some embodiments, may comprise at least slightly pressurizing the chamber with the gas. In some embodiments, operation 204 may pressurize the chamber to approximately a pressure of 100 Torr, although the scope of the invention is not limited in this respect.

Operation 206 may repeat the evacuating and purging of operation 204 to further reduce impurities (other than those in the substantially-pure gas) from the chamber to obtain a high concentration of the substantially-pure gas within the chamber. In some embodiments, operation 204 may be repeated up to three times or more depending on acceptable impurity levels.

Operation 208 performs a final evacuation (i.e., pump-down) on the chamber to generate a medium-level vacuum. This medium-level vacuum may range, for example, between approximately $1\times10^{-2}$ Torr and $5\times10^{-2}$ Torr, although the scope of the invention is not limited in this respect. In some embodiments, the medium-level vacuum may be approximately ¼ of atmospheric pressure.

Operation 210 cools the chamber to freeze the substantially-pure gas remaining in the chamber after the final evacuation of operation 208. The temperature that operation 210 cools the chamber may depend on the impurity levels in the residual gas in the chamber. For example, in some embodiments, when the gas is carbon-dioxide having in impurity-level of less than approximately 100 PPM, operation 210 may cool the chamber to about 100 degrees Kelvin, which may be at a point at which most of the gas is capable of freezing. In some embodiments, operation 210 may cool down a magnet in the chamber.

In operation 212, a high-level vacuum may be generated in the chamber by the freezing of the gas. In some embodiments, the high-level vacuum may range between approximately $1\times10^{-5}$ Torr and $1\times10^{-8}$ Torr, and even greater.

Operation 214 may further cool the chamber to a cryogenic temperature. The high-level vacuum generated in operation 212 may allow the cryogenic temperature to be achieved. In some embodiments, operation 214 may comprise cooling a magnet within the chamber to a cryogenic temperature, and the high-level vacuum within the chamber may provide insulation for the cryogenically cooled magnet. The cryogenic temperature may range, for example, between approximately 20 degrees Kelvin to two degrees Kelvin although the scope of the invention is not limited in this respect.

Although the individual operations of procedure 200 are illustrated and described as separate operations, one or more of the individual operations may be performed concurrently and nothing requires that the operations be performed in the order illustrated. Some operations may be optional.

Thus, improved systems and methods that generate high-level vacuums have been described. Also, systems and methods that more quickly generate high-level vacuums have been described. Systems and methods that generate high-level vacuums without the use of delicate and/or expensive high-power vacuum pumps have also been described. Systems and methods that generate high-level vacuums more suitable for field operations have also been described.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A method of generating a high-level vacuum comprising:

evacuating a chamber having a substantially-pure gas therein;

freezing residual gas in the chamber to generate a high-level vacuum within the chamber;

purging impurities from the chamber with the gas by filling the chamber with the gas;

repeating the filling and the evacuating to reduce impurities from the chamber and to obtain a high concentration of the gas within the chamber; and after filling the chamber with the gas, evacuating the chamber prior to freezing to generate a medium-level vacuum, wherein the substantially-pure gas has in impurity-level of less than approximately 100 parts per million (PPM), and wherein the gas is carbon-dioxide and has a freezing point of above approximately 100 degrees Kelvin at the medium-level vacuum.

2. The method of claim 1 wherein the chamber comprises a magnet chamber, and wherein freezing comprises reducing the temperature within the chamber by cooling the magnet.

3. The method of claim 2 further comprising after freezing the gas, further cooling the magnet to a cryogenic temperature, wherein the vacuum within the chamber is to provide insulation for the cryogenically-cooled magnet.

4. A vacuum insulation system comprising:

a chamber having a substantially-pure gas therein at less than atmospheric pressure;

a cooling element to freeze residual gas in the chamber to generate a high-level vacuum within the chamber; and a gas cylinder having the substantially-pure gas therein at a higher-than atmospheric pressure, the gas cylinder to at least slightly pressurize the chamber with the gas prior to the vacuum pump evacuating the chamber before freezing, wherein the substantially-pure gas has an impurity-level of less than approximately 100 parts per million (PPM), and wherein the gas is carbon-dioxide and has a freezing point of above approximately 100 degrees Kelvin at the medium-level vacuum.

5. The system of claim 4 further comprising a magnet within the chamber, and wherein the cooling element is to reduce a temperature within the chamber by cooling the magnet to at or below a freezing point of the gas at the medium-level vacuum.

6. The system of claim 5 wherein after freezing the gas, the cooling element is to further cool the magnet to a cryogenic temperature, and wherein the high-level vacuum within the chamber is to provide insulation for the cryogenically-cooled magnet.

7. The system of claim 5 wherein the magnet is an electromagnet cooled to a superconducting temperature to generate a high-level magnetic field for a radar tube in a radar system.

8. A vacuum insulation system comprising:

a chamber having a substantially-pure gas therein at less than atmospheric pressure; and a cooling element to freeze residual gas in the chamber to generate a high-level vacuum within the chamber, the chamber having essentially no other gasses therein other than the substantially-pure gas;

a medium-level vacuum pump to reduce the pressure within the chamber to a medium-level vacuum before the cooling element operates to freeze the gas; and a magnet within the chamber, wherein the cooling element is to reduce a temperature within the chamber by cooling the magnet to at or below a freezing point of the gas at the medium-level vacuum, and wherein the magnet is a superconducting magnet in a magnetic-resonance-interference (MRI) diagnostic imaging system.

9. A vacuum insulation system comprising:

a chamber having a substantially-pure gas therein at less than atmospheric pressure; and a cooling element to freeze residual gas in the chamber to generate a high-level vacuum within the chamber, wherein the chamber is to insulate an infrared seeker head of a missile, the chamber being provided with the substantially-pure gas therein, wherein the system further comprises a cooling liquid to freeze the substantially-pure gas within the chamber after launch of the missile to generate in flight the high-level vacuum within the chamber, the cooling liquid to further cool the seeker head to at least a near-cryogenic temperature, and wherein the cooling liquid comprises liquid argon, and wherein the substantially-pure gas is carbon-dioxide, and wherein the chamber is initially provided with the medium-level vacuum.

* * * * *